United States Patent Office 2,800,514
Patented July 23, 1957

2,800,514

PROCESS FOR PREPARING ALKYLATED HYDROXY AROMATIC COMPOUNDS

Charles T. Hathaway, Berkshire, Mass., assignor to General Electric Company, a corporation of New York No Drawing. Application January 7, 1955, Serial No. 480,608

10 Claims. (Cl. 260—624)

This invention relates to a new and improved process of preparing alkyl-substituted hydroxy aromatic compounds, and more particularly to an improved process of removing and recovering catalyst residues resulting in the alkylation of phenolic compounds.

Alkylated hydroxy aromatic compounds and numerous methods for their preparation are now well-known to the art. One of the more widely-used methods of preparing alkylated hydroxy aromatic compounds involves the reaction of a hydroxy aromatic compound such as phenol with a long-chain chlorinated hydrocarbon in the presence of a Friedel-Crafts type catalyst, aluminum chloride being typical. For example, in one conventional method, phenol can be condensed with a chlorinated wax in the presence of Friedel-Crafts catalysts, such as aluminum chloride, by proper manipulation. More specifically, phenol and chlorowax are first mixed together at a temperature of about 150° F. and anhydrous aluminum chloride added sufficiently slowly while actively stirring the mixture to avoid violent foaming.

While certain of the major disadvantages attendant prior processes may be eliminated by employing the processes described in my copending applications Serial Nos. 480,607 and 480,609 filed January 7, 1955, assigned to the assignee of the present invention, further improvement may be obtained in the processing and recovering of the products by employing the hereinafter described and claimed processing techniques.

While the major disadvantages attendant conventional processes, namely excessive foaming and the requirement of critical temperature control, may be eliminated by the processes of my foregoing copending applications, purification and recovery of the products by conventional means are extremely difficult and not readily adaptable to a practical and economic process. For example, when aluminum chloride is employed as the catalyst the purification and recovery of the products by presently known methods require that the product be treated with an aqueous medium that is capable of hydrolyzing the catalyst to form aluminum hydroxide which then combines with hydrogen chloride dissolved in the reaction mixture to reform aluminum chloride. When water is used as the hydrolysis agent, hydrolyzation apparently takes place but difficulty is encountered in separating the emulsions that are formed. Even when washing is repeated several times until the washings finally are neutral, the product is still not of the desired purity. While improved purification and recovery can be obtained in accordance with one conventional method by using water to which has been added a small quantity of butanol as the hydrolysis agent, it is still necessary to wash the product a half-dozen times or more in order to remove both the aluminum and the chlorine. It is also necessary to exercise stringent conditions during the washing, for example vigorous stirring at high temperatures. Moreover, when higher concentrations of aluminum chloride are used emulsion difficulties are increased.

While it is not desired to be limited to a specific theory of invention, it is believed that when aluminum metal or a Friedel-Crafts catalyst such as aluminum chloride is reacted with a phenolic compound in accordance with the reactions disclosed and claimed in my aforementioned copending applications, aluminum phenoxide is formed which in turn equilibrates with hydrogen chloride evolved during the subsequent alkylation reaction to form aluminum monochloride diphenoxide, or a mixture of aluminum chloride and phenoxide approximating this composition.

Unexpectedly, I now have found that the crude, unhydrolyzed product resulting from each of the respective reactions disclosed in my copending applications can be readily separated and final product and approximately 90 percent of the aluminum salts recovered. By careful selection of the proper conditions, the crude products may be filtered and a filter cake containing approximately 90 percent of the aluminum salts retaining a high catalytic activity and lesser amounts of phenol and alkylated phenol may be obtained. Because of its high catalytic activity, the filter cake can be recycled, thereby cutting catalyst requirements by 90 percent. Small traces of catalyst remaining in the product may be deactivated with a trace of water or a weak base. The over-all advantage of this procedure is the elimination of large quantities of wash water and other extraction agents and the corresponding apparatus required for washing and extraction resulting in a considerable reduction in cost of plant per unit quantity. In addition, an important economic consideration is that filtration time is a small fraction of the time required for water washing.

In order to realize the advantages of the process of the present invention, it is necessary that the starting phenol contain not more than 0.4 percent by weight of moisture. If the starting phenol contains a higher percentage of moisture, catalyst filtration is unsatisfactory. Although filtration may be obtained when phenols containing higher concentrations of moisture are employed, both the time for filtration and the ash content of the product are substantially increased. Generally, a high ash content is undesirable for most subsequent applications.

The reactants found eminently suitable in the process of this invention include a phenolic body, a chlorinated long-chain hydrocarbon and aluminum metal or a Friedel-Crafts catalyst such as aluminum chloride. Although it has been stated previously that the phenolic compound may contain up to 0.4 percent by weight moisture, best results are realized when the moisture content does not exceed 0.2 percent. If aluminum chloride is employed as the Friedel-Crafts catalyst, it may be any commercial grade of the anhydrous material. If aluminum metal is employed, it may be in powdered form, ribbon form, granules, etc.

The chlorinated long-chain hydrocarbons found eminently suitable in the process of the present invention include chlorinated hydrocarbons having from about 12 to about 30 carbon atoms per molecule and a chlorine content of from about 15 to about 45 percent of the chlorine by weight of the chlorinated hydrocarbons. Included in this class are the paraffin waxes and paraffin-base petroleum oils of the aforesaid carbon chain lengths and chlorine contents.

The chlorinated hydrocarbons of the foregoing description may be obtained by chlorinating a hydrocarbon mixture consisting essentially of paraffinic hydrocarbons having from about 12 to about 30 carbon atoms in their molecule. Conventional chlorination techniques may be employed in which chlorine is bubbled through the hydrocarbon mixture until the desired percentage of chlorine has been absorbed. Preferably, the original hydrocarbons should contain no more than minor amounts of aliphatic unsaturation.

The degree of chlorination is important since it is by this means that the number of aromatic hydroxy nuclei introduced into the hydrocarbon chain is determined. By this means, the flexibility of products subsequently made with this material as an intermediate may be controlled. For example, the higher the degree of chlorination the less the degree of flexibility of such products. The converse of this is similarly true.

The hydroxy aromatic compounds, preferably phenolic bodies which may be alkylated in accordance with the process of this invention, include phenol, and mono-substituted alkyl phenols, for example methyl, ethyl, propyl, etc.-substituted phenols, mono-halogenated phenols and mono-alkoxy phenols such as methoxy, ethoxy, etc. phenols.

In carrying out the reaction, either a Friedel-Crafts catalyst or aluminum metal may be added to hot phenol or, alternatively, the hot phenol added to either one of the aforementioned catalysts, at a moderate temperature of from about 50° to about 75° C. and the chlorinated hydrocarbon added to this mixture at a rate and temperature at which large concentrations of the unreacted chlorinated hydrocarbon and excessive foaming attendant prior processes are eliminated. The temperatures maintained during the second phase of the reaction, more specifically during chlorinated hydrocarbon addition, may range from about 100° to about 200° C., with a range of from about 140° to 175° C. being preferred.

In carrying out the present reaction, the proportions of reactants employed can be varied widely. For example, when mono-alkylation is desired, the quantity of the hydroxy aromatic compound which may be employed may range from about 10 mols per chlorine atom in the chlorinated hydrocarbon to as little as 0.33 mol per chlorine atom in the chlorinated hydrocarbon when a trialkylated phenol is desired. When the alkylated products are to be employed as intermediates for condensation with other ingredients, for example aldehydes or other methylene-containing compounds to form resinous products, they may be prepared by having the reactants present in such proportions that the chlorine-to-phenol ratio is from 0.1 atom of chlorine per mol of phenol to 2.0 atoms of chlorine per mol of phenol. In those cases where excess phenol remains in the alkylation mixture, the excess phenol can be separated from the alkylated product by simple vacuum or by steam distillation.

The proportion of Friedel-Crafts type catalyst or aluminum metal employed may vary. For example, a Friedel-Crafts type catalyst, such as aluminum chloride, may be employed in a range of from about 0.5 to 10 percent, by weight, of chlorinated hydrocarbon, a preferred range being from about 2 to about 5 percent. Although the quantity of aluminum which may be employed may approximate the quantity of chlorinated hydrocarbon employed on a stoichiometric basis, it generally may range from 0.2 to 5 percent, by weight, of the chlorinated hydrocarbon, a preferred range being from about 0.4 to about 1.0 percent, by weight, of the chlorinated hydrocarbon.

The conditions governing the reaction of this invention may be varied within certain limits. For example, reaction temperatures employed in the process may range from about 100° to about 200° C. with a preferred operating temperature being in the range of from about 140° to 175° C. The rate of addition of the chlorinated hydrocarbon may be as rapid as desired. Generally, a preferred rate is that at which the evolved hydrogen chloride may be readily vented or absorbed in a suitable medium. In the final separation step, a cooling period is generally not required since rapid filtration is possible within a temperature range of from about 100° to 150° C.

In order that those skilled in the art may more readily understand the process of this invention, the following examples are given by way of illustration and not by way of limitation. All parts and percentages are by weight.

EXAMPLE 1

159 parts of 99.95 percent phenol (0.05 percent moisture) were mixed with 7.8 parts of aluminum chloride. To this mixture were added gradually in 30 minutes, 300 parts of a chlorinated hydrocarbon containing approximately 19.5 percent chlorine and having an average chain length of 25 carbon atoms. Temperature during this addition was maintained at approximately 162° C. After an additional 15 minutes, hydrogen chloride evolution was negligible. A sample was steam-stripped indicating 16.7 percent unreacted phenol. The reaction mixture was filtered rapidly at a temperature of 150° C., giving a clear brown liquid and a sandy, gritty precipitate comprising aluminum salts.

To show the effect of the moisture content in the starting phenol on both the filtration rate and ash content, a series of examples were conducted in which the moisture content of the initial phenol was varied. In each example, the entire reaction product was filtered at 150° C. The results are tabulated as follows in Table I.

Table I

| Example | Percent H₂O in Starting Phenol | Rate of Filtration | A Precipitate, grams | B Filtrate, grams | $\frac{A}{A+B}$ percent | Ash Content B, percent |
|---|---|---|---|---|---|---|
| 2 | 0.05 | very rapid, <1 min. | 2.3 | 84 | 2.6 | 0.16 |
| 3 | 0.10 | very rapid, <1 min. | 2.2 | 86 | 2.6 | 0.22 |
| 4 | 0.20 | rapid, ~1 min. | 2.3 | 86 | 2.6 | 0.18 |
| 5 | 0.40 | 30 minutes | 0.2 | 90 | 0.22 | 0.81 |

It will be noted that the substantially dry phenol of Examples 2, 3 and 4, results in a very rapid filtration in which nearly all of the starting catalyst is removed as is evident from the ash content in the products. Contrasted with this is the high ash content in the product of Example 5 (0.4 percent moisture) and the slow filtration rate. However, in cases were ash content is not considered important, moisture content up to 0.4 percent still permits of a much more rapid separation than is obtainable by conventional hydrolysis and extraction processes.

Although filtration has been described generally without regard to prescribed temperature conditions, it has been found that while temperature has no effect on the product, it does have a pronounced effect on the viscosity of the filtrate. For example, filtration at a temperature of between 100° and 150° C. is very rapid as compared to times up to 30 minutes when the reaction mixture is cooled to 70° C.

While excess phenol may be removed prior to filtration, filtration of the resulting viscous alkylated phenols is not practical. If the reaction products are low in unreacted phenol and therefore too viscous for filtration, inert solvents can be used to make filtration feasible.

EXAMPLE 6

A catalyst filter cake, high in catalytic activity, obtained from a previous run was employed as follows to demonstrate the feasibility of recycling catalyst.

Approximately 27.6 parts of a catalyst filter cake, containing sufficient catalyst to give the equivalent of .76 parts aluminum, were added to 80 parts of phenol containing less than 0.2% by weight moisture and reaction was apparent at approximately 162° C. To this mixture were added 150 parts of a chlorinated hydrocarbon of the same composition as that employed in Example 1 in a 30-minute period, while maintaining the temperature at between 152° and 160° C. Progress of the reaction was indistinguishable from previous examples using aluminum chloride. The products were readily separated by filtration in the manner described in Example 1 and the catalyst cake and unreacted phenol were available to be recycled for further reaction. From the nature of the products, the activity of the catalyst filter cake, based on aluminum present, is indistinguishable from fresh catalyst prepared from aluminum present, is indistinguishable from fresh catalyst prepared from aluminum or aluminum chloride.

Alkylation of hydroxy aromatic compounds and processing of the alkylation products in accordance with the present invention results in numerous advantages over prior processes. In addition to the advantages over prior processes and the advantages more fully disclosed in my aforementioned copending applications, considerably shorter periods are required for filtration than required for the lengthy and inadequate separation techniques of the prior art. Additionally, since the filter cake contains approximately 90 percent of unhydrolyzed aluminum salts high in catalytic activity, it may be recycled readily, with its resulting economy, with only a small quantity of fresh make-up catalyst required.

The products of this invention have a wide field of utility. For example, they may be used as pour point depressants in lubricating oils and as intermediates in the preparation of various resins and varnishes, etc.

What I claim as new and desire to secure by Letters Patent of the United States is:

1. The process of preparing an alkylated hydroxy aromatic compound which comprises the steps in sequence of reacting a phenol having at least one unsubstituted nuclear carbon atom and containing not more than 0.4 percent by weight of moisture with a member selected from the group consisting of aluminum chloride and aluminum, adding to the resulting reaction mixture a long-chain chlorinated hydrocarbon, continuing the reaction at a temperature of from about 100° to 200° C. until the evolution of hydrogen chloride is negligible, filtering the hot reaction products to obtain a filtrate and a filter cake comprising unhydrolyzed aluminum salts, recovering an alkylated hydroxy aromatic compound and unreacted phenol from said filtrate, and recycling said unreacted phenol and said filter cake as catalyst for further reaction.

2. The process of preparing an alkylated hydroxy aromatic compound which comprises the steps in sequence of reacting a phenol having at least one unsubstituted nuclear carbon atom and containing not more than 0.4 percent by weight of moisture with a member selected from the group consisting of aluminum chloride and aluminum, adding to the resulting reaction mixture a long-chain chlorinated hydrocarbon having from about 12 to about 30 carbon atoms in its molecule and containing from about 15 to about 45 percent by weight of chlorine, continuing the reaction at a temperature of from about 100° to 200° C. until the evolution of hydrogen chloride is negligible, filtering the hot reaction products to obtain a filtrate and a filter cake comprising unhydrolyzed aluminum salts, recovering an alkylated hydroxy aromatic compound and unreacted phenol from said filtrate, and recycling said unreacted phenol and said filter cake as catalyst for further reaction.

3. The process of preparing an alkylated phenol which comprises the steps in sequence of reacting a phenol having at least one unsubstituted nuclear carbon atom and containing not more than 0.4 percent by weight of moisture with a member selected from the group consisting of aluminum chloride and aluminum, adding to the resulting reaction mixture a long-chain chlorinated hydrocarbon, continuing the reaction at a temperature of from about 100° to 200 C. until the evolution of hydrogen chloride is negligible, filtering the hot reaction products to obtain a filtrate and a filter cake comprising unhydrolyzed aluminum salts, recovering an alkylated phenol and unreacted phenol from said filtrate, and recycling said unreacted phenol and said filter cake as catalyst for further reaction.

4. The process of preparing an alkylated phenol which comprises the steps in sequence of reacting a phenol having at least one unsubstituted nuclear carbon atom and containing not more than 0.4 percent by weight of moisture with a member selected from the group consisting of aluminum chloride and aluminum, adding to the resulting reaction mixture a long-chain chlorinated hydrocarbon having from about 12 to about 30 carbon atoms in its molecule and containing from 15 to about 45 percent by weight of chlorine, continuing the reaction at a temperature of from about 100° to 200° C. until the evolution of hydrogen chloride is negligible, filtering the hot reaction products to obtain a filtrate and a filter cake comprising unhydrolyzed aluminum salts, recovering an alkylated phenol and unreacted phenol from said filtrate, and recycling said unreacted phenol and said filter cake as catalyst for further reaction.

5. The process of preparing an alkylated phenol which comprises the steps in sequence of reacting phenol having at least one unsubstituted nuclear carbon atom and containing not more than 0.4 percent by weight of moisture with a member selected from the group consisting of aluminum chloride and aluminum, adding to the resulting reaction mixture a long-chain chlorinated hydrocarbon having from about 12 to about 30 carbon atoms in its molecule and containing from 15 to about 45 percent by weight of chlorine, continuing the reaction at a temperature of about 100° to 200° C. until the evolution of hydrogen chloride is negligible, filtering the hot reaction products to obtain a filtrate and a filter cake comprising unhydrolyzed aluminum salts, recovering an alkylated phenol and unreacted phenol from said filtrate, and recycling said unreacted phenol and said filter cake as catalyst for further reaction.

6. The process of preparing an alkylated phenol which comprises the steps in sequence of reacting phenol having at least one unsubstituted nuclear carbon atom and containing not more than 0.4 percent by weight of moisture with a member selected from the group consisting of aluminum chloride and aluminum, adding to the resulting reaction mixture a long-chain chlorinated hydrocarbon having from about 12 to about 30 carbon atoms in its molecule and containing from 15 to about 45 percent by weight of chlorine, the quantity of said aluminum compound in said reaction mixture corresponding to from about 0.2 to about 10 percent by weight of said chlorinated hydrocarbon, continuing the reaction at a temperature of from about 100° to 200° C. until the evolution of hydrogen chloride is negligible, filtering the hot reaction products to obtain a filtrate and a filter cake comprising unhydrolyzed aluminum salts, recovering an alkylated phenol and unreacted phenol from said filtrate, and recycling said unreacted phenol and said filter cake as catalyst for further reaction.

7. The process of preparing an alkylated phenol which comprises the steps in sequence of reacting phenol having at least one unsubstituted nuclear carbon atom and containing not more than 0.2 percent by weight of moisture with aluminum chloride, adding to the resulting reaction mixture a long-chain chlorinated hydrocarbon having from about 12 to about 30 carbon atoms in its molecule and containing from 15 to about 45 percent by weight of chlorine, the quantity of said aluminum compound in said reaction mixture corresponding to from about 0.2 to about 10 percent by weight of said chlorinated hydrocarbon, continuing the reaction at a temperature of from about 100° to 200° C. until the evolution of hydrogen chloride is negligible, filtering the hot reaction products at a temperature of from about 100° to 150° C. to obtain a filtrate and a filter cake comprising unhydrolyzed aluminum salts, recovering an alkylated phenol and unreacted phenol from said filtrate, and recycling said unreacted phenol and said filter cake as catalyst for further reaction.

8. The process of preparing an alkylated phenol which comprises the steps in sequence of reacting phenol having at least one unsubstituted nuclear carbon atom and containing not more than 0.2 percent by weight of moisture with aluminum, adding to the resulting reaction mixture a long-chain chlorinated hydrocarbon having from about 12 to about 30 carbon atoms in its molecule and containing from 15 to about 45 percent by weight of chlorine, the quantity of said aluminum in said reaction mixture corresponding to from about 0.2 to about 10 percent by weight of said chlorinated hydrocarbon, continuing the reaction at a temperature of from about 100° to 200° C. until the evolution of hydrogen chloride is negligible, filtering the hot reaction products at a temperature of from about 100° to 150° C. to obtain a filtrate and a filter cake comprising unhydrolyzed aluminum salts, recovering an alkylated phenol and unreacted phenol from said filtrate, and recycling said unreacted phenol and said filter cake as catalyst for further reaction.

9. The process of claim 6 in which the chlorinated hydrocarbon is a paraffinic wax.

10. The process of claim 6 in which the chlorinated hydrocarbon is a paraffinic-base petroleum oil.

References Cited in the file of this patent

UNITED STATES PATENTS

| | | |
|---|---|---|
| 2,191,499 | Reiff | Feb. 27, 1940 |
| 2,198,595 | Amos et al. | Apr. 30, 1940 |
| 2,518,917 | Mattil | Aug. 15, 1950 |